United States Patent Office 3,125,374
Patented Mar. 17, 1964

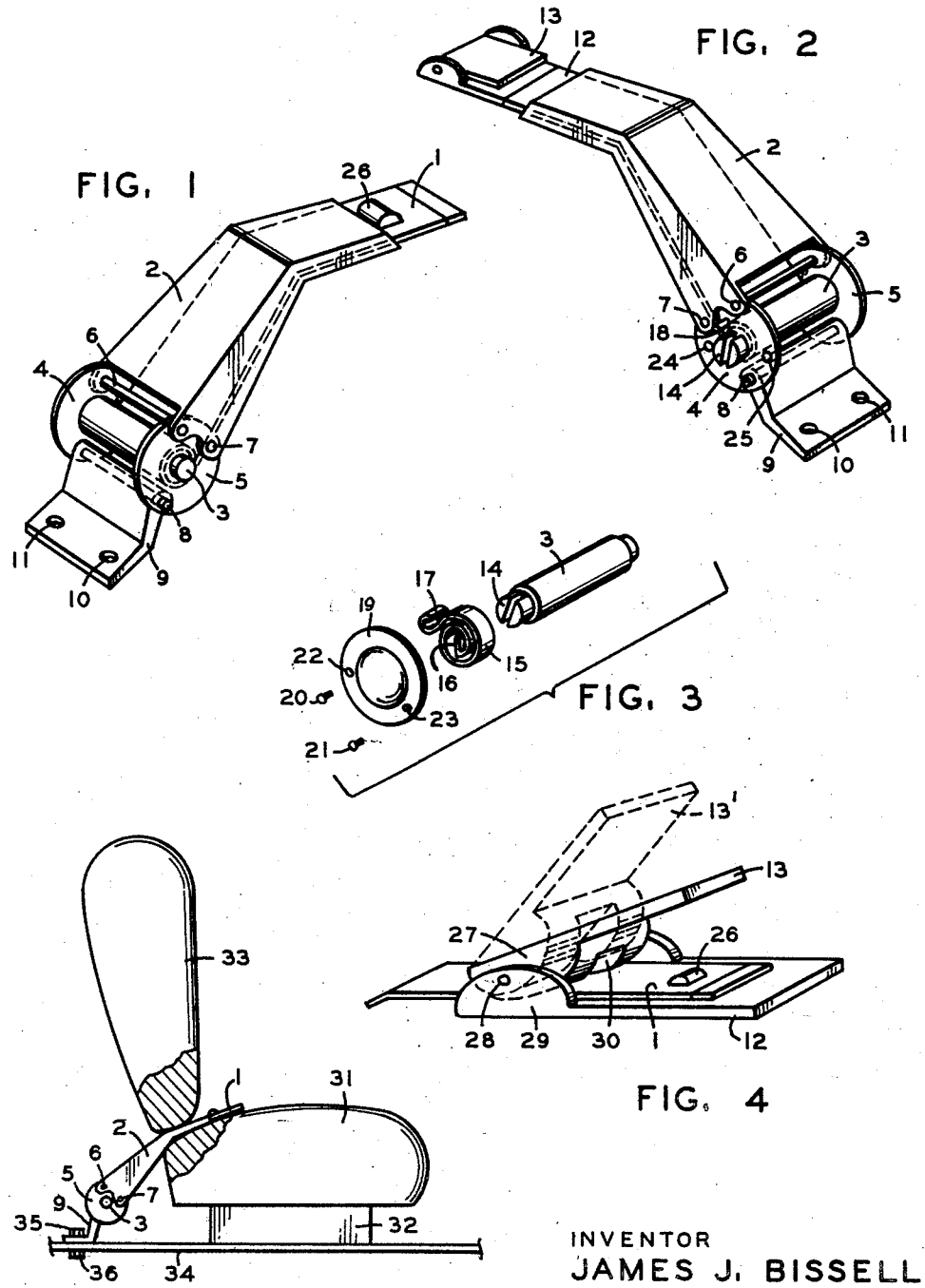

3,125,374
RETRACTABLE SAFETY BELTS
James J. Bissell, 114 Hawthorne,
St. Louis County 31, Mo.
Filed Aug. 13, 1962, Ser. No. 216,435
2 Claims. (Cl. 297—388)

This invention relates in general to safety devices for motor vehicles and particularly to the type of safety belt which is wrapped around, that is passed in front of the occupant of a motor vehicle to prevent him from being thrown forward from the seat in case of collision or sudden stopping of the vehicle.

One of the principal objections to the use of a safety belt is the untidiness of the belt lying on the seat when not in use. In addition there is a certain amount of inconvenience involved in such an arrangement. This is due to the fact that the ends of the seat belt or safety belt are often wedged between the back of the seat and the seat itself, and the occupant of the car must grope around, poking his hands into the space between the back of the seat and seat, to find and gather the ends to bring them together.

One of the principal objects of my invention is to provide a retracting mechanism for the safety seat belts. This retracting mechanism is fully automatic and is automatically actuated whenever the ends of the safety belts are released.

Another object of my invention is to provide a mechanism which will automatically store the safety belts in their retracted positions between the back of the seat and the seat itself, wound in said position neatly upon a spool and readily available without fumbling or groping.

Another object of my invention is to provide a safety seat belt mechanism which is provided with a spool upon which the belts are wound. Said spool is spring wound and when the belts are fully extended the spool itself would have to shear for the belt to break loose. Thus the spring tension is only utilized for the action of retracting the belt and is not the limiting force in determining the collision forces the belt will withstand. Previously spring retracted safety belts have been subject to this disadvantage, in that when the spring was fully extended, the spring would tear loose from its mounting and the safety belt was then freed. In my construction the mounting of the spool, which is quite strong, determines the collision forces which the belt will resist and protect the occupant from.

Another object of my invention is to provide a tunnel or casing in which the belt is disposed between the back of the seat and the seat itself. The ends of the belts project from these casings and are held ready for instant application, in a position convenient to the occupants hands, one on each side of the seated occupant.

A further object of my invention is to provide a reel asembly, in which the spool is rotatively mounted and said reel assembly is capable of being mounted on the flooring of the car, or upon the seat frame, or upon the seat base. In the drawings the reel assembly is shown bolted to the flooring of the car but this is for the purposes of illustration only and does not limit the application of my invention to the one position shown.

My invention is adaptable to both front and rear seats of automobiles, although it can be used also in aircraft seats and boat seats. In fact the arrangement of belts and reel and spool and mounting illustrated can be used to fasten cargoes securely to the floors or walls of trucks, railway cars or other vehicles.

Objects and advantages other than those set forth will be apparent from the following description when read in connection with the accompanying drawings, in which:

FIG. 1 is a perspective view of a safety belt device, holding the male end of the belt;

FIG. 2 is a perspective view of a safety belt device, holding the female end of the belt;

FIG. 3 is a composite or exploded view of the spool mechanism of FIG. 2;

FIG. 4 is a detail perspective view of the female end of the belt of FIG. 2; and FIG. 5 is a side elevational view of the belt mechanism mounted in position upon the flooring of the car and projecting between the back of the seat and the base of the seat.

Referring now more particularly to the drawings by characters of reference, FIG. 1 illustrates one half of the seat safety belt mechanism. The male portion of the safety belt 1, is shown there to be projecting from the tunnel or casing 2. The belt 1 passes through the hollow inside portion of the casing 2 and then is wrapped around the spool 3. The end of the belt is secured to the spool by being pinned to the spool or held with metal nails, not shown or otherwise secured in any conventional manner. The spool 3 is held free to rotate in the two reel sides 4 and 5. The casing is secured to or mounted upon the reel sides 4 and 5 by the rivets 6, 7. It is obvious of course that the rivets 6, 7 can be replaced by bolts, terminating in ends which are threaded and upon which nuts are located in locked position. Similarly metal screws could be used or the casing and the reel sides 4 and 5 could be made integral, which is only another variation of the present construction.

Mounted securely to the reel sides 4 and 5 by the rivet 8 is the assembly mounting plate 9. Again instead of the rivet 8 a bolt or metal screws could be employed to secure the reel sides to the assembly mounting plate.

The assembly mounting plate is provided with two bolt holes 10 and 11 upon its base member, which enable it to be mounted firmly to the flooring of the car or to any other rigid portion of the car.

FIG. 2 illustrates the entirely similar construction of the female portion of the safety belt 12, which is provided with a buckle 13 adapted to receive and lock upon the male portion 1 of the safety belt.

It will be noted that although the arrangement of the parts of the belt-retracting mechanism of FIG. 2 is entirely similar to that of FIG. 1, the view of FIG. 2 has been chosen to display the other side of the reel. Thus the reel side 4 of FIG. 2 corresponds exactly to the reel side 4 of FIG. 1 and the reel side 5 of FIG. 2 corresponds exactly to the reel side 5 of FIG. 1.

In FIG. 2 the spool 3 is shown to terminate in a slotted end 14. Cooperative with this slotted end 14 and disposed around it is the flat coil spring 15. Actually the end 16 of the flat coil spring 15 lies within the slot of the end 14 of the spool, while the body of the spring 15 is coiled several times around the slotted end 14 of the spool 3. The end 17 of the coil spring 15 is bent into a U-shape and thereby adapted to form a retaining hook which is disposed around the pin 18 mounted in the reel side 4. This is conventional structure for the use of a coil spring and cooperative slot assembly and allows the belt ends 12 and 1, each to be wound around a spool 3 in the conventional manner. In the manner described, the ends 12 and 1 may be pulled forward out of the casings 2, thereby coiling the springs 15 more tightly around the spool ends 14, and storing energy in the springs 15. When the belt ends 12 and 1 are released they will be drawn back to the front ends of the casings 2 by the action of the springs 15. A spring cover 19 is provided, as shown in FIG. 3. It is secured to the reel side 4 by the use of two metal screws 20, 21, cooperative with the holes 22, 23 in the spring cover 19 and the holes 24, 25 in the reel side 4.

It will be seen from the FIG. 1 that the action of the spring 15 will retract the male end 1 until the stop 26 embedded in the end 1 rests against the front edge of the casing 2. The female end 12 can similarly be retracted by its cooperative coil spring 15 until the buckle portion 13 of the end 12 projects against the front edge of the corresponding casing 2. Thus it will be seen that the two ends 1 and 12 of the belt are always available projecting from the casings 2, where they can easily be grabbed and pulled forth in the desired manner.

The buckle 13 is shown in FIG. 4 to consist of a cam portion 27 rotatable upon the rivet 28 in the sides of the buckle mounting plate 29, in the customary manner. The cam portion 27 of the buckle is knurled on its under side to provide a tight grip upon the male end portion 1 of the safety belt.

In its raised position 13', the buckle is not in contact with the male end portion 1 of the belt and thus the belt male end portion 1 can be withdrawn from the buckle 13. However a slot 30 has been provided to allow the stop 26 to pass through the buckle 13 in the raised or released position. Without this slot 30 the stop 26 would prevent the end 1 from being withdrawn.

In FIG. 5, the seat 31 is shown to be mounted upon the seat base 32. The casing 2 is shown to project between the seat 31 and the seat back 33. The assembly mounting plate 9 is securely mounted to the flooring 34 of the auto, by means of the bolts 35 which pass through the holes 10 and 11 of the assembly mounting plate 9, the bolts 35 being provided with nuts 36.

It will be noted that the casing 2 keeps the seat back 33 spread apart from the seat 31. Thus the belt portions 1 and 12 are free to run back and forth inside the casing 2. This is necessary because generally in passenger car seats the seat back and the seat fit together with considerable pressures.

In addition attention is drawn to the following considerations. Upon the impact of collision, the seat belt ends 1 and 2 will allow the passenger to move forward slightly, by moving against the springs 15, however when the limit of the springs 15 has been reached, it is the strength of the spools 3 which transmits the impact forces to the mounting plates 9 which are secured to the flooring of the car. Consequently the spring pressures are not what hold the passenger in his seat. The spring pressures enable the passenger to be held in a sort of shock mounting. He is cradled in the springs, which gradually absorb the impact pressures or forces, until the springs reach the limit of the forces they can take. Then the spool mounting and the mounting plates serve to hold the passenger rigidly in place.

While the foregoing description describes certain specified forms of the invention by way of example, it will be understood that they are merely for the purposes of illustration to make clear the principle of the invention, which is not limited to the particular form shown but is accessible to various modifications and adaptations in different arrangements as will be apparent to those skilled in the art without departing from the scope of the invention as stated in the following claims.

I claim:

1. The combination with a passenger seat mounted upon the flooring of a car and comprised of a seat base and a seat back, of a safety belt comprising a pair of retractable belt members, each belt member retractably disposed in a casing and one end of said belt member projecting from one end of said casing, said casing projecting between said seat base and said seat back, a pair of reel sides rigidly mounted upon the other end of said casing, a spool rotatably mounted in and between said reel sides and the other end of said belt member fixed to and rolled around said spool, a slot in one end of said spool, a flat coil spring, one end of which is disposed in said slot in said spool end, the body of said spring being coiled around said slotted spool end, a pin mounted on the reel side next to said slotted spool end, the other end of said spring fixed to said pin, a spring cover mounted over said slotted end of said spool and said spring on the reel side, and an assembly mounting plate fixed to said reel sides and adapted to fix said reel sides and casings rigidly to said car flooring and cam means on the end of one of said belt members to lock said belt members together in any extended position.

2. The combination as described in claim 1 and further characterized by a buckle on one of said belt members, a slot on said buckle, and a stop on the other belt member to limit the travel of said other belt member, said stop adapted to pass through said buckle in said slot therein.

References Cited in the file of this patent
UNITED STATES PATENTS

| | | |
|---|---|---|
| 2,843,335 | Hoven | July 15, 1958 |
| 2,905,231 | Olson | Sept. 22, 1959 |